(12) United States Patent
Lucas et al.

(10) Patent No.: US 7,561,529 B2
(45) Date of Patent: Jul. 14, 2009

(54) OPTIMIZING THE SPEED OF AN FC-AL SWITCH DOMAIN IN A DATA STORAGE NETWORK

(75) Inventors: Gregg S Lucas, Tucson, AZ (US); Robert A Kubo, Tucson, AZ (US); John C Elliott, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 11/231,402

(22) Filed: Sep. 20, 2005

(65) Prior Publication Data
US 2007/0064492 A1    Mar. 22, 2007

(51) Int. Cl.
*H04L 12/28* (2006.01)
(52) U.S. Cl. .................. 370/252; 370/253; 370/465; 370/524; 711/167
(58) Field of Classification Search ......... 370/250–253, 370/233, 465, 524; 710/167
See application file for complete search history.

(56) References Cited
U.S. PATENT DOCUMENTS

| | | | |
|---|---|---|---|
| 4,493,021 A | 1/1985 | Agrawal et al. | |
| 5,247,546 A | 9/1993 | Abbiate et al. | |
| 5,727,171 A | 3/1998 | Iachetta, Jr. | |
| 6,311,245 B1 | 10/2001 | Klein | |
| 6,389,476 B1 | 5/2002 | Olnowich | |
| 6,477,171 B1* | 11/2002 | Wakeley et al. | ............. 370/404 |
| 6,636,501 B1 | 10/2003 | Dispensa et al. | |

* cited by examiner

*Primary Examiner*—Seema S Rao
*Assistant Examiner*—Wanda Z Russell
(74) *Attorney, Agent, or Firm*—Dan Shifrin

(57) ABSTRACT

In a fibre channel, arbitrated loop (FC-AL) network environment, an operating speed of devices within a switch domain within the network is optimized. The FC-AL switch domain is isolated from an attached storage controller, and a first signal is transmitted to each of a plurality of storage devices within the domain. The first signal comprises a request that each storage device transmit inquiry data to a control and management node (CMN) within the domain. In response to receipt of the inquiry data from each storage device, the speeds at which each storage device is operable are identified and an operational speed is then established for the domain. The established speed may be the fastest speed at which all devices can operate. Alternatively, one or more slower devices may be bypassed and the established speed may be the fastest speed at which all remaining devices can operate.

12 Claims, 3 Drawing Sheets

OPTIMIZING THE SPEED OF AN FC-AL SWITCH DOMAIN IN A DATA STORAGE NETWORK

RELATED APPLICATION DATA

The present application is related to commonly-assigned and co-pending U.S. application Ser. No. 10/995,459, entitled APPARATUS AND METHOD TO SET THE SIGNALING RATE OF A SWITCH DOMAIN DISPOSED WITHIN AN INFORMATION STORAGE AND RETRIEVAL SYSTEM, filed Nov. 22, 2004, and U.S. application Ser. No. 10/993,768, entitled APPARATUS AND METHOD TO SET THE SIGNALING RATE OF A NETWORK DISPOSED WITHIN AN INFORMATION STORAGE AND RETRIEVAL SYSTEM, filed Nov. 18, 2004, which applications are incorporated herein by reference in their entirety.

TECHNICAL FIELD

The present invention relates generally to fibre-channel, arbitrated-loop (FC-AL) networks with storage devices and, in particular, to optimizing the speed of an FC-AL switch domain in such a network.

BACKGROUND ART

In a fibre-channel, arbitrated-loop (FC-AL) storage network, an FC-AL initiator, such as a RAID storage controller, is attached to one or more host devices and to one or more switch domains. Each domain typically is contained within an enclosure and includes an FC-AL switching device, a control and management node (CMN) and a plurality of FC-AL devices, such as data storage drives.

Each storage drive may be operated at one of several speeds, such as 1 Gigabit per second, 2 Gbps or 4 Gbps. In many existing networks, the speed of the devices in a domain are set at system initialization and do not change during normal operation. Moreover, the speed setting of the domains in a network is set to the speed of the switching device, regardless of the capabilities of the FC-AL devices themselves. Consequently, the domain may not be operating at an optimal speed.

One proposed solution is described in the above referenced U.S. application Ser. No. 10/995,459, entitled APPARATUS AND METHOD TO SET THE SIGNALING RATE OF A SWITCH DOMAIN DISPOSED WITHIN AN INFORMATION STORAGE AND RETRIEVAL SYSTEM, filed Nov. 22, 2004. The CMN directs that each storage device in the domain operate at the lowest speed; all devices should respond. The CMN then directs that each storage device operate at the next speed; those devices which are capable at that speed will respond. The process continues until all of the available speeds have been tested and the CMN has a record of which devices can operate at which speeds. The speed of the domain may then be set accordingly, such as to a speed at which all devices can operate.

SUMMARY OF THE INVENTION

The present invention provides a faster process for determining the optimal speed of devices in a domain. In one embodiment, the present invention provides a method for establishing an operational speed of an FC-AL switch domain. The method comprises isolating an FC-AL switch domain from an attached storage controller and transmitting a first signal to each of a plurality of storage devices within the domain. The first signal comprises a request that each storage device transmit inquiry data to the CMN. In response to receipt of the inquiry data from each storage device, the speeds at which each storage device is operable are identified and an operational speed is established for the domain.

In another embodiment, the present invention provides a control and management node (CMN) for an FC-AL switch domain. The CMN comprises a first port coupled to an FC-AL switching device through which the switch domain is attached to an FC-AL initiator, a plurality of out-of-band ports to which a like plurality of FC-AL devices are attached, and control logic. The control logic is programmed to isolate the switch domain from the FC-AL initiator and transmit a first signal to each of the plurality of FC-AL devices. The first signal comprises a request that each FC-AL device transmit inquiry data to the CMN. The speeds at which each FC-AL device is operable are identified in response to receipt of the inquiry data from each FC-AL device and an operational speed is established for the domain.

In still a further embodiment, the present invention provides a computer program product of a computer readable medium usable with a programmable computer, the computer program product having computer-readable code embodied therein for establishing an operational speed of an FC-AL switch domain. The computer-readable code comprises instructions for isolating an FC-AL switch domain from an attached storage controller, transmitting a first signal to each of a plurality of storage devices within the domain. The first signal comprises a request that each storage device transmit inquiry data to the CMN. The speeds at which each storage device is operable are identified in response to receipt of the inquiry data from each storage device and an operational speed is established for the domain.

In still another embodiment, the present invention provides a method for deploying computing infrastructure, comprising integrating computer readable code into an FC-AL control and management node (CMN) in an FC-AL switch domain. The code, in combination with the computing system, is capable of performing the following: isolating the FC-AL switch domain from an attached FC-AL initiator, transmitting a preliminary signal to each of a plurality of storage devices within the domain, the preliminary signal comprising a request that each storage device begin operating at a lowest operating speed, whereby each storage device is capable of communicating with the CMN, transmitting a first signal to each of the storage devices, the first signal comprising a request that each storage device transmit inquiry data to the CMN, identifying the speeds at which each storage device is operable in response to receipt of the inquiry data from each storage device, and establishing an operational speed for the domain.

DETAILED DESCRIPTION OF THE PREFERRED EMBODIMENT

Figure 1A:
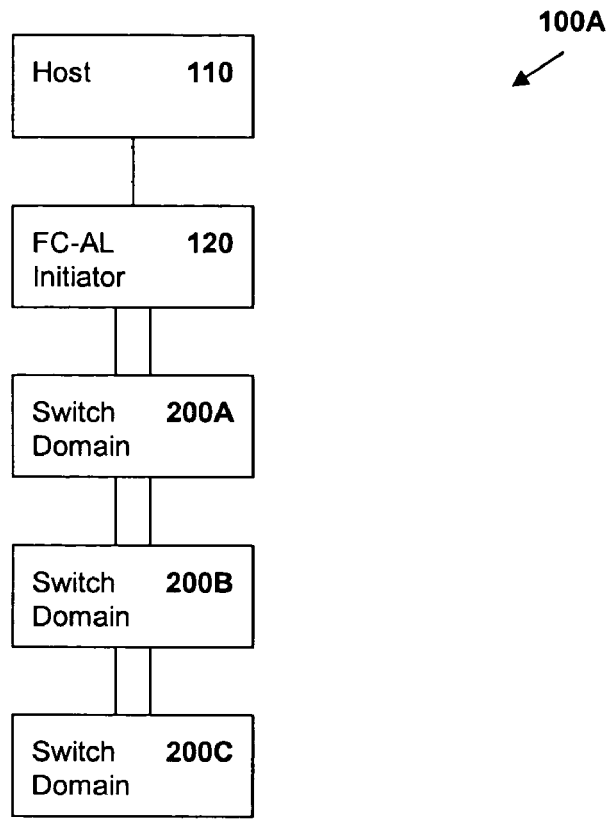
FIG. 1A is a block diagram of one configuration of a fibre channel, arbitrated loop (FC-AL) network in which the present invention may be implemented.
Figure 1B:
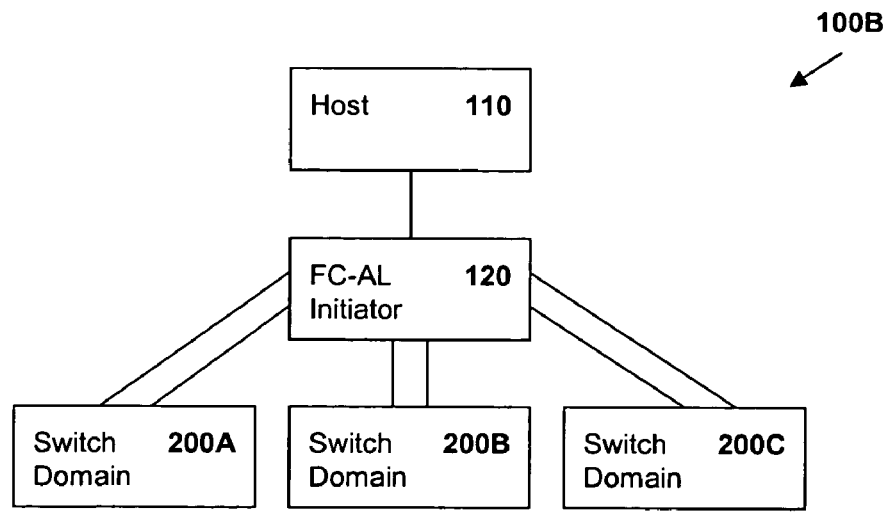
FIG. 1B is a block diagram of alternate configuration of an FC-AL network in which the present invention may be implemented.

FIGS. 1A and 1B illustrate alternate configurations 100A, 100B of a fibre channel, arbitrated loop (FC-AL) network. Such a network includes one or more host devices 110 to which is attached an FC-AL initiator 120 (which may also be known as a storage controller, a RAID controller or a system controller). Attached to the FC-AL initiator 120 are switch domains 200A, 200B and 200C. It will be appreciated that any number of switch domains 200 may be attached to the FC-AL initiator 120 up to the capacity of the FC-AL initiator 120. In the configuration of FIG. 1A, the switch domains 200A, 200B, 200C are attached to the FC-AL initiator 120 in a daisy chain fashion while in the configuration of FIG. 1B, they are each attached directly to the FC-AL initiator 120. The operation of the present invention does not depend on the particular configuration of the FC-AL network 100.

The term "attach" is commonly used in the industry to refer to a functional relationship between two devices in which the devices may or may not be physically connected directly to each other. Rather, the devices may be attached directly, through a network, or through one or more intermediate devices, components or systems. Consequently, as used herein, "attach" and "couple" do not necessarily require a direct physical connection.

Figure 2:
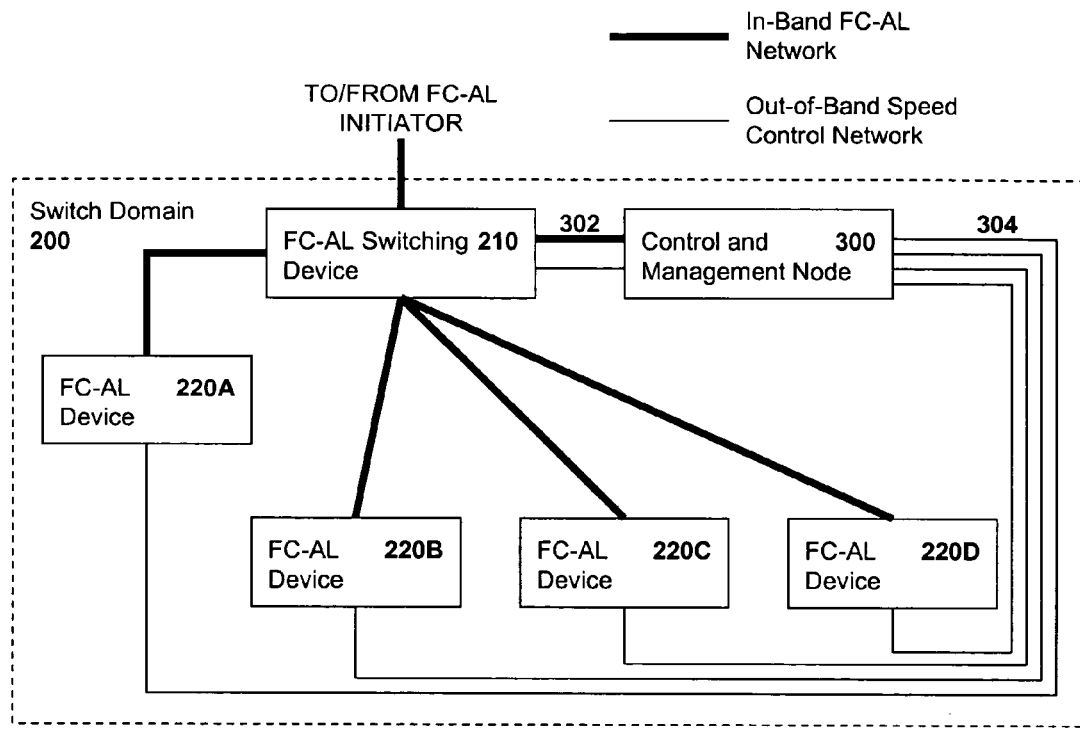
FIG. 2 is a block diagram of a switch domain within an FC-AL network of FIG. 1A or FIG. 1B.

FIG. 2 is a block diagram of one switch domain 200 within the network 100. The components of the switch domain 200 are typically housed within an enclosure. The switch domain 200 includes an FC-AL switching device 210 which, through an appropriate adapter or port (not shown) attaches the domain 200 to the FC-AL initiator 120. The switch domain 200 further includes a control and management node (CMN) 300 which is attached to the FC-AL switching device 210 through both an in-band FC-AL interconnect and an out-of-band speed control network. Each of a plurality of FC-AL devices 220A, 220B, 220C and 220D within the domain 200 is coupled to the FC-AL switching device 210 through in-band paths and is also coupled to the CMN 300 through out-of-band paths. The FC-AL devices 220 may include storage drives (also know as hard disk drives or HDDs) which may be individual drives or comprise a RAID array. The number of FC-AL devices 220 is not critical to the present invention and may be more or fewer than the four illustrated in FIG. 2.

Figure 3:
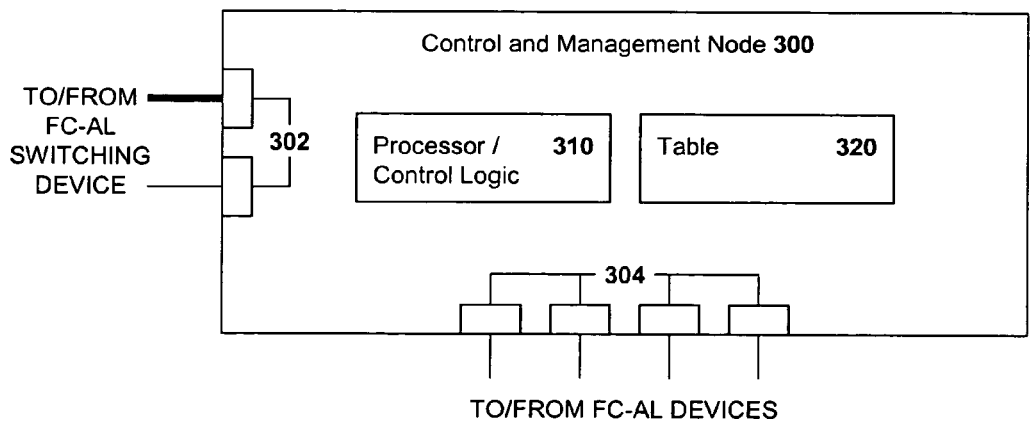
FIG. 3 is a block diagram of a control and management node within the switch domain of FIG. 2.

As illustrated in FIG. 3, the CMN 300 is coupled to the FC-AL initiator 120 via FC-AL switching device 210 and the FC-AL devices 220 through appropriate ports 302 and 304, respectively. The CMN 300 further includes a processor or control logic 310 and an information table 320 containing FC-AL device inquiry data as described below.

Figure 4:
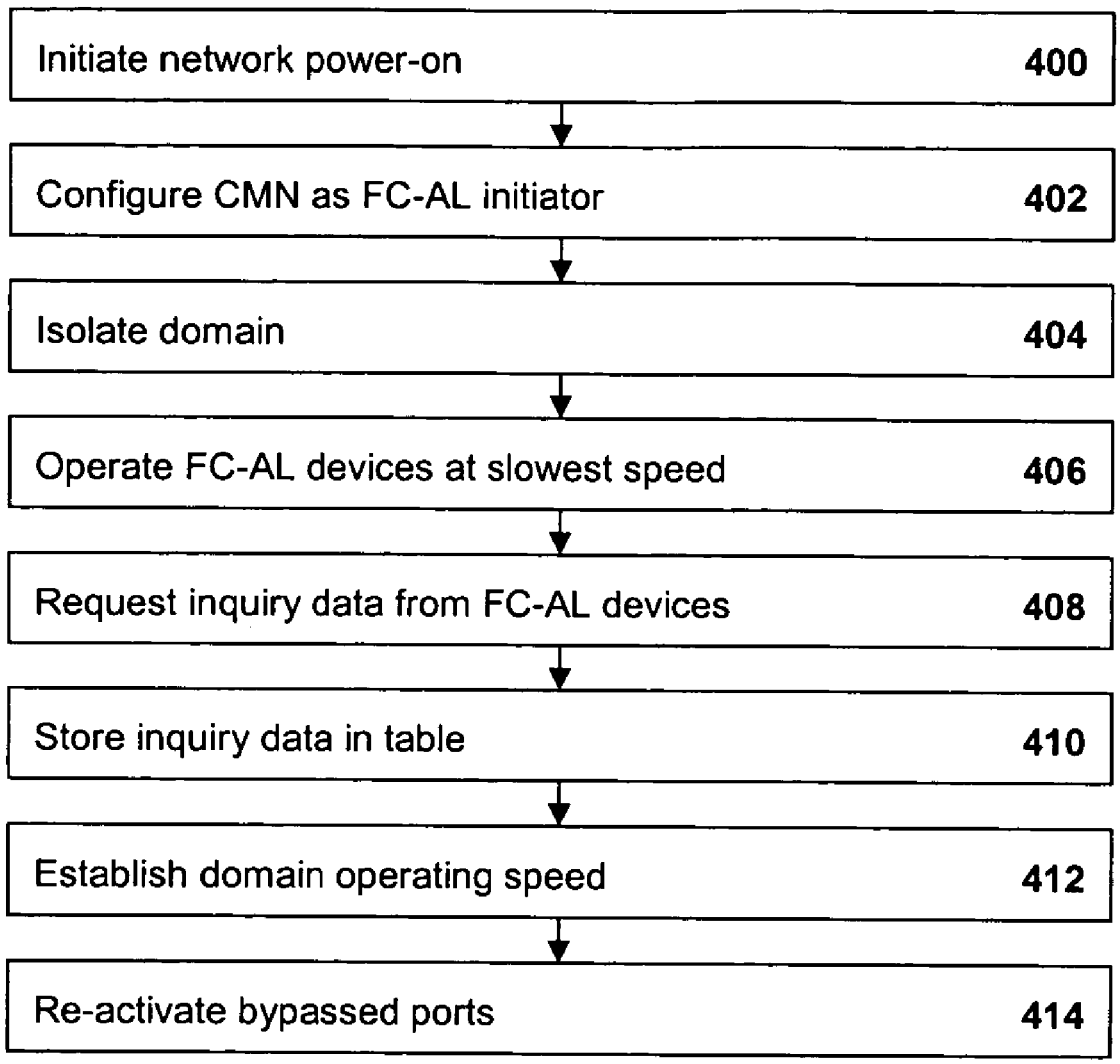
FIG. 4 is a flow chart of a method of the present invention.

Different FC-AL devices 220 may be capable of operating at different speeds, such as 1 Gigabit per second, 2 Gbps or 4 Gbps. However, all of the FC-AL devices 220 within the domain 200 should operate at the same speed. Instead of setting the speed of all devices to the slowest common speed (such as 1 Gbps), the present invention determines and establishes an optimized speed, preferably the greatest common speed; that is, the fastest speed at which all FC-AL devices 220 are capable of operating. Referring to the flow chart of FIG. 4, during the power-on sequence of the network 100 (step 400), the CMN 300 is configured as an FC-AL initiator (step 402). The CMN 300 directs that all ports within the switch domain 200 which communicate with devices outside the domain 200 (such as the ports of the FC-AL switching device 210 through which the FC-AL initiator 120 is attached) are bypassed, thus effectively disconnecting and isolating the domain 200 from the network 100 (step 404).

The CMN 300 next preferably transmits a preliminary signal to the attached FC-AL devices 220A-220D directing that the devices 220A-220D all operate at the slowest possible speed (step 406). Thus, it can be assured that the CMN 300 will be able to communicate with all of the devices 220A-220D. The CMN 300 then transmits another signal to the devices 220A-220D requesting that each transmit inquiry data back to the CMN 300 (step 408). The inquiry data is preferably stored in a data structure, such as the table 320 (step 410), and used to establish an operating speed for the domain 200 (step 412) and the domain 200 placed back on-line by re-activating the bypassed ports (step 414).

In one embodiment, the CMN 300 establishes the operating speed. In another embodiment, the CMN 300 reports the inquiry data to the FC-AL initiator 120 which sets a common operating speed for all domains 200A, 200B and 200C in the network 100. In still a further embodiment, a policy may be established by a system administrator at a customer management console or other user input component.

The operating speed established for the domain 200 may be the fastest common speed at which all FC-AL devices 220A-220D in the domain 200 are capable of operating (that is, the fastest speed of the FC-AL device with the slowest maximum speed). Alternatively, if it is desired that the domain 200 operate at a higher speed and not be limited by the slowest device, the CMN 300 may direct that the slowest device(s) be bypassed, thereby allowing the other devices to operate at a faster common speed.

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for establishing an operational speed of an FC-AL switch domain or a method for deploying computing infrastructure comprising integrating computer readable code into a computing system for establishing an operational speed of an FC-AL switch domain.

What is claimed is:

1. A method executed within a control and management node (CMN) for establishing an operational speed of an FC-AL switch domain, comprising:

isolating an FC-AL switch domain from an attached storage controller;

transmitting a first signal through out-of-band ports to each of a plurality of storage devices within the domain, the first signal comprising a request that each storage device transmit inquiry data to the CMN;

in response to receipt of the inquiry data from each storage device, determining that a first storage device has a maximum operational speed which is slower than the maximum operational speed of any of the remainder of the storage devices;

bypassing the first storage device from the domain; and establish an operational speed for the domain which is the fastest speed at which all of the remainder of the storage devices in the domain are operable.

2. The method of claim 1, further comprising, prior to transmitting the first signal, transmitting a preliminary signal through the out-of-band ports to each of the plurality of storage devices within the domain, the preliminary signal comprising a request that each storage device begin operating at a lowest operating speed, whereby each storage device is capable of receiving the first signal.

3. The method of claim 1, further comprising, prior to transmitting the first signal, bypassing all ports in the domain which communicate with devices outside of the domain, whereby the first signal is transmitted only to storage devices within the domain.

4. The method of claim 1, further comprising transmitting the established operational speed to an FC-AL initiator to which the domain is attached.

5. A control and management node (CMN) for an FC-AL switch domain, comprising:

a first port coupled to an FC-AL switching device through which the switch domain is attached to an FC-AL initiator;

a plurality of out-of-band ports to which a like plurality of FC-AL devices are attached, the plurality of FC-AL devices also attached to the FC-AL switching device;

control logic programmed to:

isolate the switch domain from the FC-AL initiator;

transmit a first signal through the out-of-band ports to each of the plurality of FC-AL devices, the first signal comprising a request that each FC-AL device transmit inquiry data to the CMN;

in response to receipt of the inquiry data from each FC-AL device, determining that a first storage device has a maximum operational speed which is slower than the maximum operational speed of any of the remainder of the storage devices;

bypassing the first storage device from the domain; and establishing an operational speed for the domain which is the fastest speed at which all of the remainder of the storage devices in the domain are operable.

6. The control and management node of claim 5, wherein the control logic is further programmed to, prior to transmitting the first signal, transmit a preliminary signal through the out-of-band ports to each of the plurality of FC-AL devices within the domain, the preliminary signal comprising a request that each FC-AL device begin operating at a lowest operating speed, whereby each FC-AL device is capable of receiving the first signal.

7. The control and management node of claim 5, wherein the control logic is further programmed to, prior to transmitting the first signal, bypass all ports in the domain which communicate with devices outside of the domain, whereby the first signal is transmitted only to FC-AL devices within the domain.

8. The control and management node of claim 5, wherein the control logic is further programmed to transmit the established operational speed to the FC-AL initiator.

9. A computer program product of a computer readable storage medium usable with a programmable computer, the computer program product having computer-readable code embodied therein for and executed within a control and management node establishing an operational speed of an FC-AL switch domain, the computer-readable code comprising instructions for:

isolating an FC-AL switch domain from an attached storage controller;

transmitting a first signal through the out-of-band ports to each of a plurality of storage devices within the domain, the first signal comprising a request that each storage device transmit inquiry data to the CMN;

in response to receipt of the inquiry data from each storage device, determining that a first storage device has a maximum operational speed which is slower than the maximum operational speed of any of the remainder of the storage devices;

bypassing the first storage device from the domain; and establishing an operational speed for the domain which is the fastest speed at which all of the remainder of the storage devices in the domain are operable.

10. The computer program product of claim 9, wherein the computer-readable code further comprises instructions for, prior to transmitting the first signal, transmitting a preliminary signal through out-of-band ports to each of the plurality of storage devices within the domain, the preliminary signal comprising a request that each storage device begin operating at a lowest operating speed, whereby each storage device is capable of receiving the first signal.

11. A method for deploying computing infrastructure, comprising integrating computer readable code into an FC-AL control and management node (CMN) in an FC-AL switch domain, wherein the code, in combination with the computing system, is to perform the following:

isolating the FC-AL switch domain from an attached FC-AL initiator;

transmitting a preliminary signal through the out-of-band ports to each of the plurality of storage devices within the domain, the preliminary signal comprising a request that each storage device begin operating at a lowest operating speed, whereby each storage device is to communicate with the CMN;

transmitting a first signal through the out-of-band ports to each of the storage devices, the first signal comprising a request that each storage device transmit inquiry data to the CMN;

in response to receipt of the inquiry data from each storage device, determining that a first storage device has a maximum operational speed which is slower than the maximum operational speed of any of the remainder of the storage devices;

bypassing the first storage device from the domain; and establishing an operational speed for the domain which is the fastest speed at which all of the remainder of the storage devices in the domain are operable.

12. The method of claim 11, wherein the code is further to transmit the established operational speed to an FC-AL initiator to which the domain is attached.

* * * * *